Feb. 4, 1930. H. P. DONLE 1,745,608
POWER SOURCE FOR RADIORECEIVERS
Filed Aug. 13, 1925
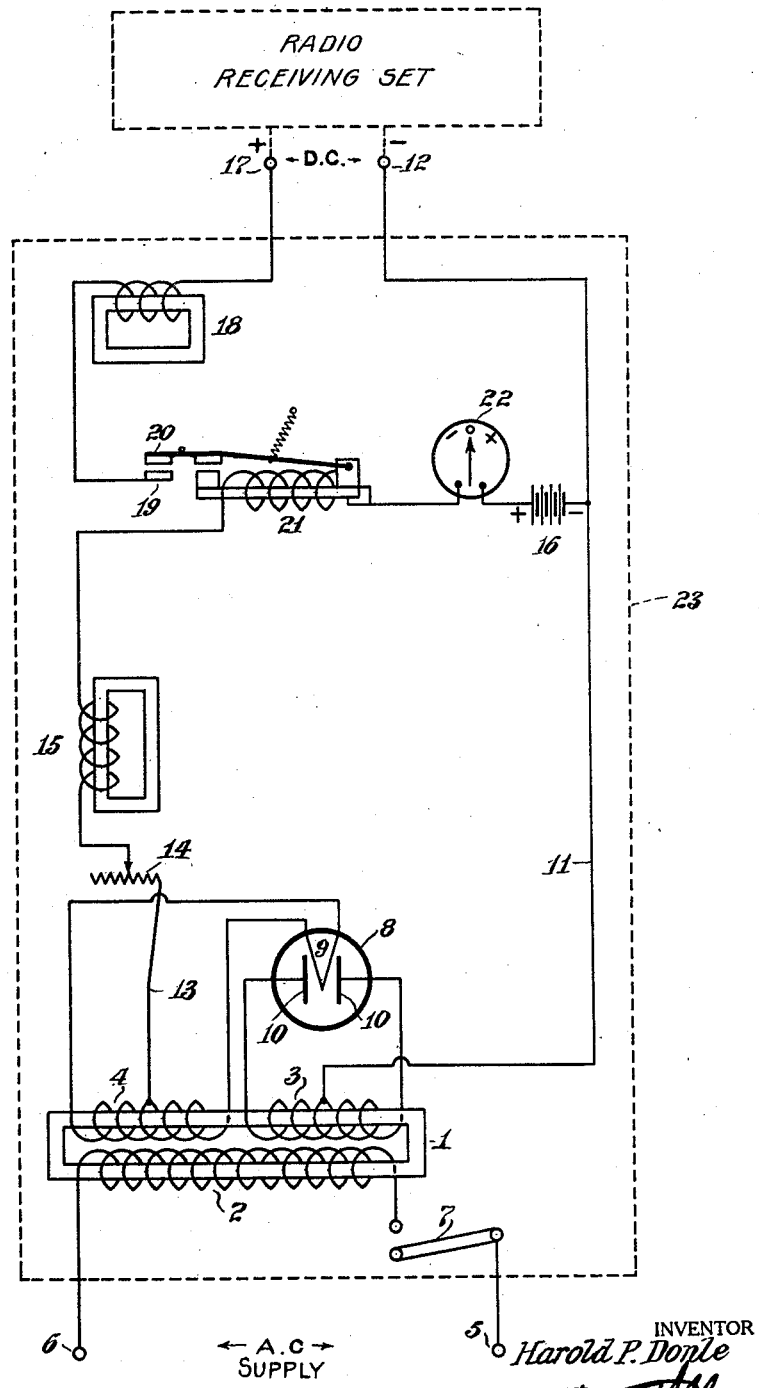

Patented Feb. 4, 1930

1,745,608

UNITED STATES PATENT OFFICE

HAROLD POTTER DONLE, OF MERIDEN, CONNECTICUT, ASSIGNOR TO THE CONNECTICUT TELEPHONE & ELECTRIC COMPANY, INCORPORATED, OF MERIDEN, CONNECTICUT, A CORPORATION OF CONNECTICUT

POWER SOURCE FOR RADIORECEIVERS

Application filed August 13, 1925. Serial No. 50,092.

The main object of my invention is to provide simple, reliable and inexpensive apparatus for supplying the filament circuit of a radio receiving set directly from an ordinary alternating current lighting circuit.

It has been proposed to do this by providing complicated transformer and filter arrangements to prevent humming. I propose to employ a very small battery in a sense floated on the line in such a way as to smooth out pulsations and maintain a general balance regardless of the usual fluctuation in the line voltage and variation in wave form and within reasonable commercial limits regardless of the number and character of tubes used in the receiving set.

For this purpose I propose to furnish a power set having a transformer, a rectifier and a small local battery. The battery is connected across the D. C. side of the set and adapted to be automatically connected across the output end when the input end is energized.

The drawing shows a typical circuit diagram embodying one form of my invention.

In the form shown the transformer 1 has a primary 2 with two double secondaries 3 and 4.

5 and 6 are the A. C. terminals. A switch 7 may be provided to control the supply.

The rectifier tube 8 is preferably of the full wave type having the cathode filament 9 and the two anodes 10, 10. The cathode filament is supplied with current from the secondary 4 and the anodes are connected to the outer ends of the secondary 3. The center of the secondary 3 is connected by conductor 11 to the D. C. terminal 12. The center of the other secondary 4 is connected by conductor 13, resistance 14 and inductor 15 to one side of battery 16, the other side of which is connected to conductor 11.

The other D. C. terminal 17 is connected to choke coil 18 and switch contact 19. The contact 20 is carried by the spring retracted armature member of a relay whose magnet coil 21 is inserted in the line between 15 and 18.

I also prefer to employ an ammeter 22 in the battery circuit and also to have the resistance 14 variable. The meter is so arranged that the zero point is in the center, and the deflections to right and left, therefore, indicate the direction of current flow into or out of the battery 16.

The battery 16 may consist of four ordinary dry cells such as are commonly employed as "B-batteries." It should be understood, however, that equivalent storage batteries may be employed. The entire set can be readily encased in a box 23 (suggested by dotted lines only) for convenience in handling and operation.

When the A. C. or input line is open no current will flow in the output line even if the receiving set is "on" since the switch contacts 19—20 are "open." When the D. C. circuit is closed either the battery or the rectified current energizes the relay 21 and closes the contacts 19—20 and this furnishes D. C. for the receiving set.

In other words the battery 16 will be receiving a charge from the rectified A. C. at the same time that the rectified current and the battery are furnishing current to the receiving set. The output of the battery, so to speak, fills in the spaces between the pulses of rectified current. The rheostat 14 is then adjusted until the ammeter 22 shows zero current again which means that the battery is receiving a charge equal in magnitude to the current drawn from it. Under these conditions a small drycell battery will continue to operate for many months, whereas if it were used for supplying the full power required it would become exhausted in a few hours. It is important to maintain the ammeter indication, as controlled by the resistor 14, at zero in order to obtain the longest battery life. The coils 15 and 18 are connected in circuit so as to cooperate with the battery in preventing the A. C. hum from disturbing the D. C. output.

The relay 21 serves to prevent the battery from being drawn upon before the A. C. source is connected otherwise the battery would be discharged and ruined in a few moments.

When the A. C. supply is discontinued or in case the rectifier circuit is interrupted or if the rectified current fails for any cause the relay 21 automatically opens the battery output circuit and thus saves the battery from being run down and probably ruined.

The small battery connected across the D. C. line acts very much like a condenser of high capacity and low impedance smoothing out the pulsations of voltage and maintaining a steady and uniform output free from objectionable hum.

This arrangement obviates the necessity of the large, heavy and expensive batteries commonly employed and ensures a current supply which is substantially constant and cheap.

I claim:

1. A power source for a radio receiver, comprising a rectifier system, a battery connected to the output of said system, a load circuit and an electromagnetically operated switch, operated by the rectified current for automatically connecting the battery in the load circuit when the rectifier is in operation.

2. A power source comprising a rectifier, a battery, rheostat, choke coil and indicator in circuit with said rectifier, a discharge circuit and means for automatically connecting said circuit to said battery when current is supplied from said rectifier.

3. A power source comprising a rectifier having a discharge circuit containing a rheostat and a choke coil, an output circuit, a small battery and an automatic electro-magnetically operated switch for connecting said battery in said output circuit.

4. The combination of an alternating current supply, a rectifier therefor, a battery, a receiving set and automatic electro-magnetically operated means for connecting said battery and rectifier to said set only when the rectifier is in operation.

5. The combination of an alternating current source, a rectifier therefor, a battery, set terminals, means for connecting said battery and said rectifier to said terminals and electro-magnetic means for automatically opening the circuit from the battery to the set terminals when current ceases to flow in the rectifier circuit.

6. A power set comprising an alternating current source, a rectifier connected thereto, a battery adapted to be revivified thereby, set terminals, means for automatically connecting said battery to said set terminals when current is drawn from said rectifier, and automatically disconnecting said battery from said set terminals upon the cessation of the current supply from said rectifier.

7. A power set comprising an alternating current source, a rectifier connected thereto, a battery adapted to be reactivated thereby, set terminals, and means for automatically connecting said battery to said set terminals when current is drawn from said rectifier and means for disconnecting said battery when current from said rectifier is not flowing.

8. A power set comprising a transformer, a rectifier connected thereto, a battery and an ammeter connected to the output from said rectifier, a receiving set fed from said battery and from said rectifier and an automatic electro-magnetically operated switch in said battery circuit, so disposed as to automatically prevent the use of said battery alone as a power source for said receiving set.

9. A power set comprising a transformer, a rectifier connected thereto, a battery and a direct current ammeter connected to the output from said rectifier, a receiving set fed from said battery and from said rectifier, a rheostat in said ammeter circuit, and a circuit-breaker so arranged as to automatically disconnect said battery when said rectifier is not functioning.

10. A power set comprising an alternating current source, a rectifier therefor, a receiving set connected thereto, a battery too small by itself to supply said set for longer than a brief period of time, means for connecting said battery across said rectifier output so that said battery is alternately revivified and discharged so as to smooth out the pulsations of voltage, and electro-magnetic means for automatically preventing the use of said battery alone as a power source.

11. The combination of an alternating current supply, a rectifier therefor, a battery, a receiving set, electro-magnetic means for automatically connecting said battery and rectifier to said set only when the rectifier is in operation and means for disconnecting the battery when said rectifier is inactive.

12. The combination of an alternating current supply, a rectifier therefor, a relatively smaller battery, a receiving set, electro-magnetic means for automatically connecting said battery and rectifier to said set when the rectifier is in operation, and spring means for disconnecting said battery and rectifier from said set upon the cessation of operation of said rectifier.

HAROLD P. DONLE.